United States Patent [19]

Bagby

[11] B 3,914,848

[45] Oct. 28, 1975

[54] METHOD FOR RECLAIMING COLLET HOSE FITTINGS

[75] Inventor: Thomas L. Bagby, East Peoria, Ill.

[73] Assignee: Caterpillar Tractor Co., Peoria, Ill.

[22] Filed: Sept. 17, 1973

[21] Appl. No.: 397,990

[44] Published under the Trial Voluntary Protest Program on January 28, 1975 as document no. B 397,990.

Related U.S. Application Data

[62] Division of Ser. No. 230,827, March 1, 1972, Pat. No. 3,787,950.

[52] U.S. Cl. .................................. 29/427; 29/426
[51] Int. Cl.² ........................................ B23P 19/02
[58] Field of Search .......... 29/234, 235, 235.5, 236, 29/237, 255, 280, 282, 263, 265, 426, 427

[56] References Cited
UNITED STATES PATENTS

| | | | |
|---|---|---|---|
| 1,094,978 | 4/1914 | Church | 29/237 |
| 1,342,763 | 6/1920 | Sarjeant | 29/237 |
| 2,246,954 | 6/1941 | Schleinitz | 29/237 |
| 3,130,493 | 4/1964 | Scudieri | 29/237 |
| 3,653,114 | 4/1972 | Bawden et al. | 29/237 |

Primary Examiner—C. W. Lanham
Assistant Examiner—James R. Duzan
Attorney, Agent, or Firm—Phillips, Moore, Weissenberger Lempio & Strabala

[57] ABSTRACT

Certain collet type hose fittings have malleable fingers radially collapsed toward its stem to secure the skived end of hydraulic hose telescoped on its stem and subsequent to the removal of the finger constricting member of the fitting a short piece of hose adjacent to the fitting can be secured on a mandrel having a co-axial plunger and the plunger advanced to abut against the distal end of the stem to force the hose fitting off the skived end of the short piece of hose, without undue deflection of the malleable fingers.

3 Claims, 3 Drawing Figures

METHOD FOR RECLAIMING COLLET HOSE FITTINGS

This is a division, of Ser. No. 230,827, filed Mar. 1, 1972, Now. U.S. Pat. No. 37,879,50.

BACKGROUND OF THE INVENTION

This invention relates to a tool and pertains more particularly to a method and apparatus for removal of stem-collet assemblies of reusable nose couplings from a section of hose.

Hose fittings are typically expensive and generally have a useful life considerably in excess of the life of a hose with which it is used. For this reason, considerable savings can be achieved by reclaiming and reusing such fittings. The main problem with reclamation of such fittings is that no convenient method and apparatus for such reclamation has heretofore existed. Such prior known methods have been complicated and time consuming and often resulted in damage to the coupling, rendering it non-usable.

A typical example of the type of hose coupling for which the present method and apparatus has particular application is disclosed and claimed in U.S. Pat. No. 3,325,194, entitled "High Pressure Hydraulic Hose Coupling Assembly," filed Feb. 23, 1965, in the name of Charles E. Grawey, and assigned to the assignee of the present invention. This particular hose coupling is comprised of a generally cylindrical, hollow, stem member co-axial with and secured to one end of a split, generally cylindrical collet having a plurality of fingers radially spaced from the stem to define a cylindrical space for receiving a hydraulic hose. The stem and collet are formed of malleable material. A hardened cylindrical sleeve or retaining member having an interior surface comprising a first constant diameter approximately equal to the outer diameter of the collet adjacent one end, a second smaller constant diameter adjacent the other end, and a tapered portion therebetween, is axially forced over the collet in a manner such that the second constant diameter overlies the collet outer surface. The malleable collet fingers are swaged inwardly by the tapered portion of the sleeve interior to reduce the cylindrical space between the stem and collet fingers and grip the hose securely. To compensate for hose dimensional tolerances, the coupling dimensions are such that the swaging action at the outer collet surface not only deforms the collet fingers inwardly but also deforms the stem to a lesser degree to assure proper gripping action.

In order for such a coupling to be reusable, it will be understood that it must first be separated from the hose. One method that has been employed for occasional repair of hose assemblies is to remove the sleeve member through employment of a hydraulic press or impact tool, lift the collect fingers with a screwdriver or other pointed tool, and remove the hose from the stem portion. while this method is satisfactory for occasional repairs, it has two serious drawbacks that must be considered. Such procedure is time consuming and thus not suitable for a facility where hose assemblies are frequently repaired. Additionally, in lifting the collet fingers, the distance the fingers are moved is a matter of human judgement. In many instances, repair personnel will move the fingers radially outward an excessive amount to insure complete separation from the hose exterior. The fingers must then be urged inwardly when the coupling is used on a new section of hose. Excessive bending of the malleable fingers causes fatiguing and failure, and results in a lesser number of occassions of reuse than can be expected from more careful and efficient practices.

A second method involving specially designed service tooling is generally employed by major repair and manufacturing facilities to remove hose couplings from hose without deleteriously affecting the desirable reusable feature. In this method, a pusher rod approximately equal in diameter to the hose I.D. is inserted in the hose end to abut the end of the coupling stem and the sleeve is removed in a hydraulic press. The stem-collet and hose end is then removed from the press, a puller ring of constant I.D. is fitted over the hose cover and a tapered pusher sleeve is fitted over the pusher. The entire assembly is then replaced in the press and the pusher sleeve axially forced into the hose bore such that its tapered surface underlies the puller ring located on the hose O.D. and the hose is gripped therebetween. The assembly is then relocated in the press such as to free the stem-collet and hold the puller ring, and a force is applied to the free end of the pusher rod to separate the stem-collet unit from the hose. The force required to separate the parts multiplies the holding force on the hose between the puller ring and the pusher sleeve. After the stem-collet is removed, the hose must be placed in a vise and the puller ring loosened and removed through employment of a hammer. The hose must then be relocated in the vise and the pusher sleeve removed from the hose end by prying with the pusher rod.

The above discussed method and apparatus for reclaiming hose couplings is satisfactory from the standpoint of protecting the reusable feature. The apparatus and required method of use, however, are understandably not suited for use in a facility where considerable numbers of hose couplings are reclaimed. The tooling consists of a multiple number of parts and use of the tooling for intended purposes requires a multiple of steps. This renders the reclaiming process time consuming and expensive, and in turn seriously detracts from the importance of the designed reusable feature of the hose couplings.

SUMMARY OF THE INVENTION

It is therefore the primary object of the present invention to provide a method and apparatus that overcomes the above described problems of the prior art.

Another object of the present invention is to provide a simple and inexpensive method and apparatus for reclaiming hose couplings.

A further object of the present invention is to provide an apparatus for removing hose couplings in a quick and efficient manner without damage to the coupling.

Still another object of this invention is to overcome the above described problems by providing a novel, unitary tool structure consisting of relatively few separate components and exhibiting high degrees of simplicity and working efficiency.

In accordance with the present invention, there is provided a combined gripping and plunger assembly that is to be used in conjunction with a press. The apparatus is operative to grip the open end of a short section of hose and engage the stem with the plunger. Actuation of the press applies axial force to the plunger to separate the stem-collet from the hose. Release of the axial force permits the tool and hose end to be readily removed from the press after which the tool and hose are easily separable by moving the gripping means away from the hose and extracting the plunger from the hose bore.

BRIEF DESCRIPTION OF THE DRAWINGS

Other objects of this invention will become apparent from the following description when read in conjunction with the accompanying drawings wherein.

DESCRIPTION OF THE PREFERRED EMBODIMENT

Figure 1:
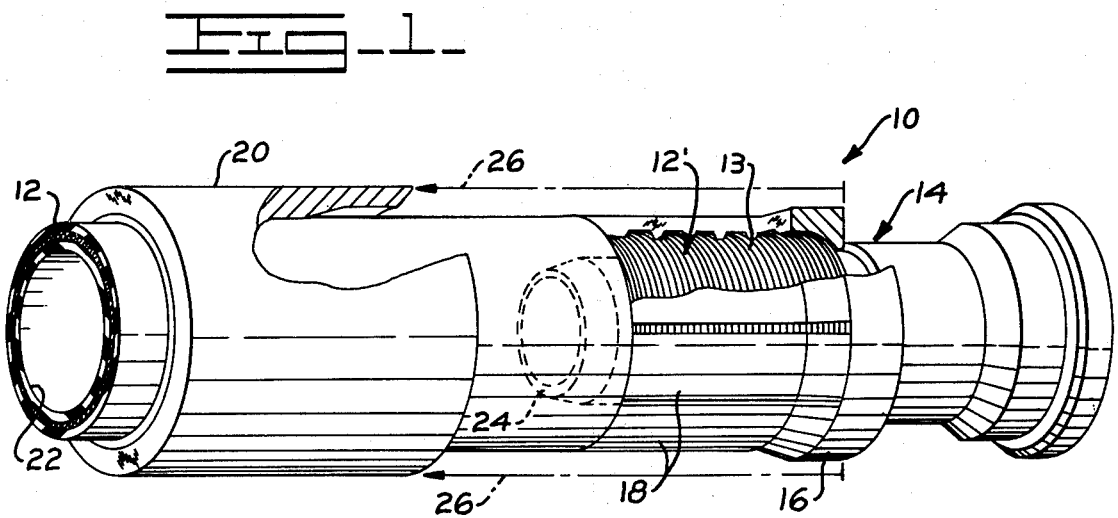
FIG. 1 is a perspective view, partially in section, of a hose coupling for which the invention has particular application, with the sleeve member removed from the coupling assembly.
Figure 3:
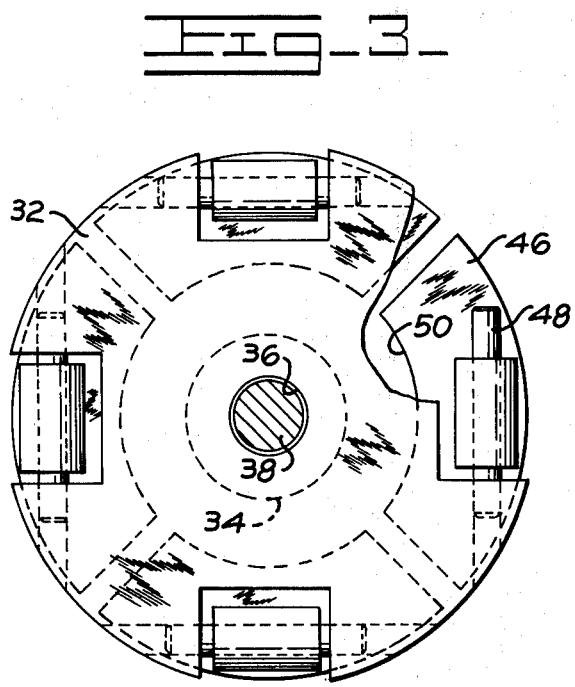

Referring now to FIG. 1 of the drawings, there is shown a reusable hose coupling generally designated by the numeral 10, and being of the general type for which the instant invention has particular application, and shown with a section of hose to which it is attached. The coupling comprises generally a stem 14 for receiving an end 12' of a hose 12 and a split collet 16 with fingers 18 extending over end 12' of the hose and forced into clamping engagement therewith by a sleeve member 20. Details of the construction and application of this coupling assembly are disclosed and claimed in the hereinbefore identified U.S. Pat. No. 3,325,194, and therefore form no part of the present invention. Accordingly, FIG. 1 is intended for exemplary purposes only in showing the configuration of the various parts when the coupling is assembled on a hose. Sleeve 20 is shown removed from its normally assembled position overlying the collet member 16.

The skived end 12' of hose 12 is shown with the exposed reinforcing wires in contact with the grooved inner surface of collet fingers 18. The hose liner 22 overlies the stem portion 24 which is externally grooved. The stem and collet are of malleable material and the collet fingers are deformed inwardly as shown when the sleeve is assembled to grip the skived hose end in a cylindrical area between the stem and the collet fingers.

When the hose 12 fails and it becomes necessary to install the coupling components on a new section of hose, the initial step in reclaiming the coupling is to remove sleeve 20 from collet 16 in the direction shown by arrows 26. This relieves the radially directed forces imposed on fingers 18 by the internal diameter of sleeve 20. Since the stem-collet assembly 12 is formed of malleable material, the collet fingers 18 will have taken a permanent set during assembly of the coupling and will maintain a holding force on the skived end 12' of hose 12 after removal of sleeve 20. It thus becomes obvious that complete separation of the hose and the stem-collet cannot be achieved without imparting some physical movement to collet fingers 18 to relieve the holding force on reinforcing wires 13, or, alternately, applying a mechanical force in a manner to overcome such holding force, thereby separating the stem-collet from the hose.

The first of the above mentioned methods is not desirable since undue bending and fatiguing of the collet fingers normally occurs. The latter mentioned method has been found to be feasible if a mechanical load is applied properly at the end of stem 24 while the hose 12 is physically restrained. In this manner, collet fingers 18 are only required to move radially outward an amount sufficient to clear the wire reinforcement 13. It is the latter approach that the present invention uses, as will be better seen in the following description re FIG. 2.

Figure 2:
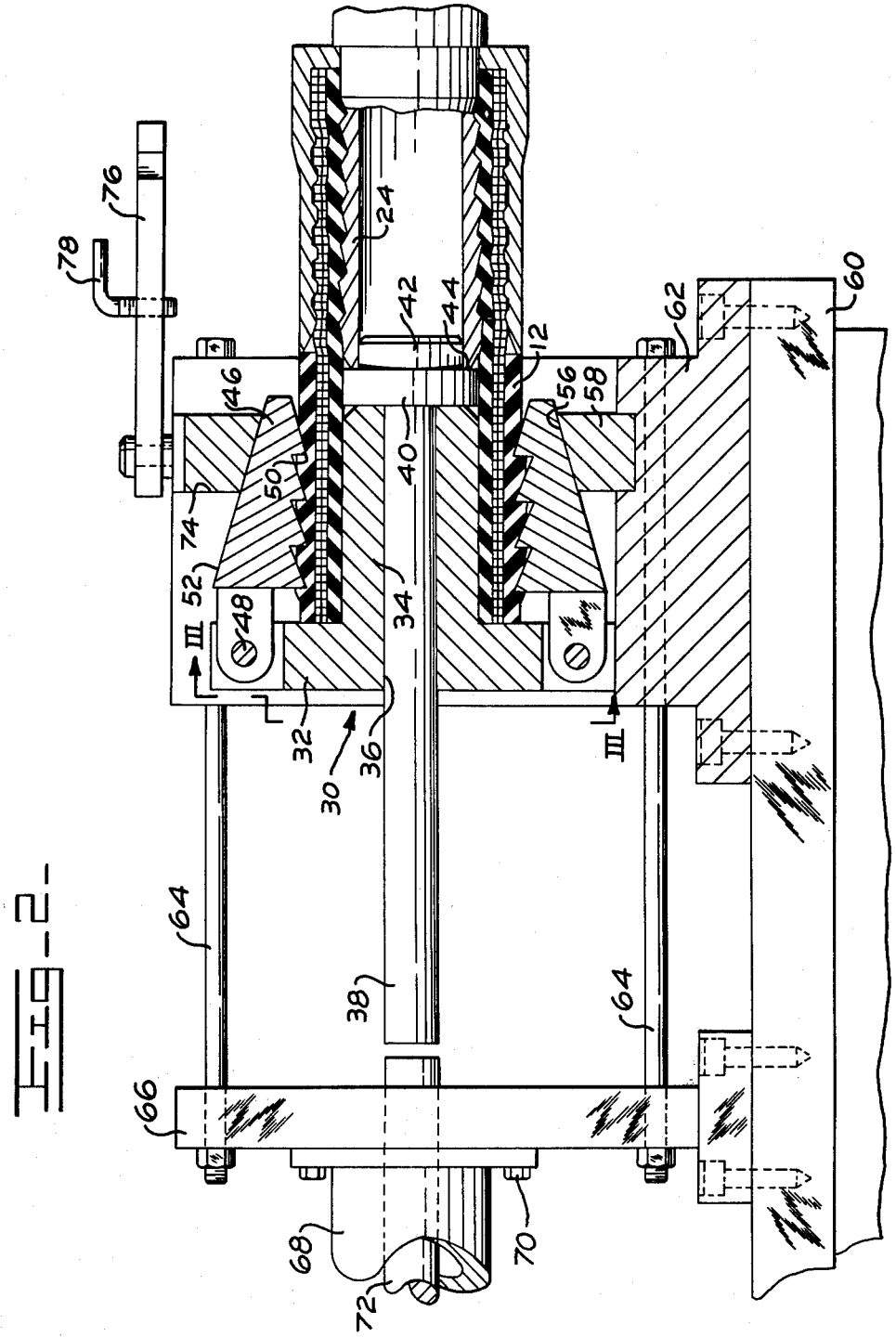
FIG. 2 is a side view, partially in section, showing the tool engaged in a hose end and coupling preparatory to carrying out the reclaiming function; and, FIG. 3 is a view generally along lines III—III of FIG. 2 of the gripper assembly with parts broken away to illustrate the position of various parts.

Referring now to FIG. 2, the apparatus of the present invention, generally designated by the numeral 30, is shown in the operative position in conjunction with a hose coupling for carrying out the steps of the present invention. The apparatus comprises generally a clamping and plunger assembly to be used in conjunction with a hydraulic press or the like. The apparatus as illustrated, comprises a body member 32 having a certain substantially circular configuration and a cylindrical projection of reduced diameter extending co-axially therewith to form a pilot member or cylindrical mandrel 34. A co-axial bore 36 extends through the body member and mandrel along the axis thereof in which is reciprocally mounted a plunger comprising an elongated cylindrical rod 38 and a stepped head member. The stepped head member comprises first cylindrical portion 40 of substantially the same diameter as mandrel 34 and a second member 42 with an annular shoulder 44 formed therebetween. The cylindrical member 42 is of slightly less diameter than the internal diameter of the stem member 24 and serves as a pilot member. The annular shoulder 44 is adapted to engage the end of the stem 24 to apply or transmit an axial force thereto.

Gripping means for gripping the end of a hose comprises a plurality of gripping elements or members 46, each of which is pivotally connected as by a pin 48 to the body member 32. The gripping members or elements 46 are disposed in an annular arrangement about the mandrel 34. The gripping elements 46 are further spaced a slight distance away from the mandrel 34 to form an annular space therebetween for receiving the open end of a hose.

The gripping elements 46 are formed with a serrated gripping face 50 directed inwardly toward mandrel 34, and a tapered outer surface 52 adapted to cooperatively engage the tapered walls of an opening 56 formed in a fixture plate 58. The tapered opening 56 cooperates with the tapered outer surface 52 of the gripping elements 46 to function as camming means for forcing the gripper elements tightly into engagement with the section of a hose member 12. This camming action results when an axial force is imposed on body member 32, forcing it to the right with respect to the plate 58, resulting in a tighter gripping of the end of the hose member 12 between the gripping elements 46 and the mandrel 34. As is readily apparent, the greater the force acting on the body member 32, the greater will be the camming action imposed by the plate member 58, and consequently, the tighter the grip will be on the end of the hose by means of the gripping means. Thus, when an axial force is imposed on rod 38, forcing the shoulder 44 into tighter engagement with stem 24 in an attempt to force it or eject it from the end of the hose section, the additional force will be transmitted to the gripping means, resulting in an increased camming action and a resultant increase in the gripping action.

In carrying out the operation of the present invention, a hose coupling having a stem-collet assembly which is desired to reclaim, is cut a short distance from the stem-collet assembly, leaving a short section of the hose, such as is shown in FIG. 2, such that a portion of the hose can extend over the mandrel 34 extending between the mandrel and gripping elements 46 and preferably having the shoulder 44 of the ram engage the end of stem 24. Prior to insertion of the hose into the gripping apparatus, the collar 20 is removed in a convenient manner, leaving the fingers 18 of the collet-stem assembly exposed as shown in FIG. 1. The section of hose, together with the stem-collet assembly, is then inserted in the apparatus of the present invention, as illustrated in FIG. 2, such that the free end of the hose extends between the gripping elements 46 and the mandrel 34. The gripping elements 46 are then cammed into engagement with the hose section, gripping the hose between the face 50 and mandrel 34. An axial force is then imposed on the plunger rod 38, forcing the head against stem 24, moving the entire stem and collet assembly to the right off the end of the section of hose 12. This force may be imposed on the plunger member in a suitable manner such as by a hydraulic press, as will be described.

Movement to the right of the stem collet assembly will force the fingers 18 of the assembly to move outward sufficient to pass over the reinforcing wires 13 of the end 12' of the hose member 12. Once the stem-collet assembly is forced off the end of the hose section, it may be re-sized if necessary and refitted to a new section of hose. The gripping elements 46 are then moved out of engagement with the plate 58 by moving the entire body 32 in the leftward direction, as viewed in FIG. 2. This permits the gripping elements 46 to be pivoted away from mandrel 34 and the section of hose 12 may then be removed and discarded.

The apparatus of the present invention may be used in conjunction with a conventional hydraulic press, portions of which are illustrated in FIG. 2. The hydraulic press comprises a base member 60 to which is conveniently secured in a suitable manner a fixture block 62, which is further secured by a plurality of bolts 64 to a supporting member 66 of a hydraulic press. The hydraulic press includes a hydraulic cylinder 68 attached by bolts 70 to the supporting member 66 and includes a piston (not shown) attached to a piston rod 72. The piston rod 72 engages plunger rod 38 to apply an axial force thereto. The fixture block 62 comprises a generally U-shaped structure having a groove 74 formed therein for receiving the plate 58. The fixture plate 58 is slidable into the groove 74 and held into place by a keeper bar 76 which bridges the open top of the U-shaped block and has a tension screw 78 which may be tacked against the upper surface of the plate 58.

While the present invention has been described with respect to a specific embodiment, it is to be understood that the present invention is not to be so limited. It is apparent that numerous changes and modifications mau be made in the apparatus of the present invention and in the method of practicing same without departing from the spirit and scope of the present invention as defined in the appended claims.

I claim:

1. A method of removing a coupling assembly comprising a stem, a split collet having a plurality of fingers and a retaining member from the end of a hose, said method comprising the steps of:

severing said hose at a point spaced from the end of said stem thereby leaving a section of hose extending from said stem to be engaged by gripping means;

removing said retaining member from said assembly to allow the collet fingers to expand outward;

providing clamping apparatus for gripping said section of said hose;

securing the end of said hose in said clamping apparatus;

extending a plunger into the bore of said section of hose and engaging the end of said stem with said plunger; and applying a force to the end of said stem by means of said plunger to thereby push said stem from the end of said hose.

2. The method of claim 1 wherein the step of applying force to said stem is carried out by means of a hydraulic ram.

3. The method of claim 1 wherein said step of providing clamping apparatus comprises providing a combination of clamping apparatus and plunger wherein said clamping apparatus includes a cylindrical mandrel for extending into said section of hose and gripping jaws surrounding said mandrel for engaging said hose, and said plunger is mounted in a bore in said mandrel and extendable therefrom.

* * * * *